US012613747B2

(12) United States Patent
Yang et al.

(10) Patent No.: US 12,613,747 B2
(45) Date of Patent: Apr. 28, 2026

(54) METHOD FOR CONTROLLING FOCUSED ULTRASOUND THERAPY DEVICE BASED ON ARM ARCHITECTURE

(71) Applicants:Shanghai Shende Green Medical Era Healthcare Technology Co., Ltd., Shanghai (CN); Shende (Ningbo) Medical Device Technology Co., Ltd, Ningbo (CN); Nantong Shende Medical Device Technology Co., Ltd, Nantong (CN)

(72) Inventors: Bo Yang, Shanghai (CN); Shengfa Zhang, Shanghai (CN); Jiawei Gu, Shanghai (CN); Jiabao Wen, Shanghai (CN); Junjie Guo, Shanghai (CN); Bo Wei, Shanghai (CN); Hao Wu, Shanghai (CN); Zihao Liu, Shanghai (CN); Zhiqiang Su, Shanghai (CN)

(73) Assignees: Shanghai Shende Green Medical Era Healthcare Technology Co., Ltd., Shanghai (CN); Shende (Ningbo) Medical Device Technology Co., Ltd, Ningbo (CN); Nantong Shende Medical Device Technology Co., Ltd, Nantong (CN)

( * ) Notice: Subject to any disclaimer, the term of this patent is extended or adjusted under 35 U.S.C. 154(b) by 676 days.

(21) Appl. No.: 18/180,466

(22) Filed: Mar. 8, 2023

(65) Prior Publication Data

US 2023/0218275 A1    Jul. 13, 2023

Related U.S. Application Data

(63) Continuation of application No. PCT/CN2021/082585, filed on Mar. 24, 2021.

(30) Foreign Application Priority Data

Sep. 9, 2020    (CN) ......................... 202010941501.5

(51) Int. Cl.
 *G06F 9/46*        (2006.01)
 *G06F 9/48*        (2006.01)
   (Continued)

(52) U.S. Cl.
 CPC .......... *G06F 9/5038* (2013.01); *G06F 9/4818* (2013.01); *G06F 9/4881* (2013.01);
   (Continued)

(58) Field of Classification Search
 CPC .............................. G16H 10/60; G16H 50/70
 See application file for complete search history.

(56) References Cited

U.S. PATENT DOCUMENTS

| | | | | |
|---|---|---|---|---|
| 11,350,908 B2* | 6/2022 | Martin | .................. | A61B 8/483 |
| 2007/0157207 A1* | 7/2007 | Kim | ...................... | G06F 9/4893 |
| | | | | 718/103 |

(Continued)

FOREIGN PATENT DOCUMENTS

| | | |
|---|---|---|
| CN | 1570855 A | 1/2005 |
| CN | 103559085 A | 2/2014 |

(Continued)

OTHER PUBLICATIONS

First Office Action issued in counterpart Chinese Patent Application No. 202010941501.5, dated Apr. 27, 2021.

(Continued)

*Primary Examiner* — Bing Zhao
(74) *Attorney, Agent, or Firm* — Westbridge IP LLC

(57)        ABSTRACT

Disclosed is a method for controlling a focused ultrasound therapy device based on an Acorn RISC Machine, the focused ultrasound therapy device being connected to a (Continued)

workstation and an ARM embedded processor running a linux operating system, the ARM embedded processor storing a first control program, the workstation storing a second control program, the method including: the first control program controlling the focused ultrasound therapy device by executing a task and sending a task execution result to the second control program; the task includes an internal event and an operation instruction, the internal event includes a timer event of the first control program and an interrupt message of a linux kernel, the second control program receives the operation instruction through the workstation and sends the operation instruction to the first control program.

10 Claims, 2 Drawing Sheets

(51) Int. Cl.
G06F 9/50 (2006.01)
G06F 9/54 (2006.01)

(52) U.S. Cl.
CPC .............. G06F 9/544 (2013.01); *G06F 9/545* (2013.01); *G06F 2209/5018* (2013.01)

(56) References Cited

U.S. PATENT DOCUMENTS

| | | | | |
|---|---|---|---|---|
| 2010/0274941 A1* | 10/2010 | Wolfe | .................. | G06F 9/5033 |
| | | | | 710/264 |
| 2016/0080281 A1 | 3/2016 | Kim et al. | | |
| 2016/0112540 A1 | 4/2016 | Xia | | |

FOREIGN PATENT DOCUMENTS

| | | |
|---|---|---|
| CN | 108132892 A | 6/2018 |
| CN | 108710552 A | 10/2018 |
| CN | 109558235 A | 4/2019 |
| CN | 208723624 U | 4/2019 |
| CN | 112134859 A | 12/2020 |
| IN | 111209046 A | 5/2020 |
| RU | 2359721 C2 | 6/2009 |
| WO | 2011119019 A1 | 9/2011 |
| WO | 2014178523 A1 | 11/2014 |

OTHER PUBLICATIONS

International Search Report and Written Opinion issued in corresponding PCT Application No. PCT/CN2021/082585, dated Jun. 23, 2021.
First Office Action issued in counterpart Russian Patent Application No. 2023106850/07, dated Aug. 9, 2023.

* cited by examiner the main thread receives and caches tasks and prioritizes the tasks the working thread executes tasks according to the priorities, and reads and writes register to control focused ultrasound therapy device, and sends back the execution result to the main thread the main thread sends the execution result to the second control program

FIG. 1

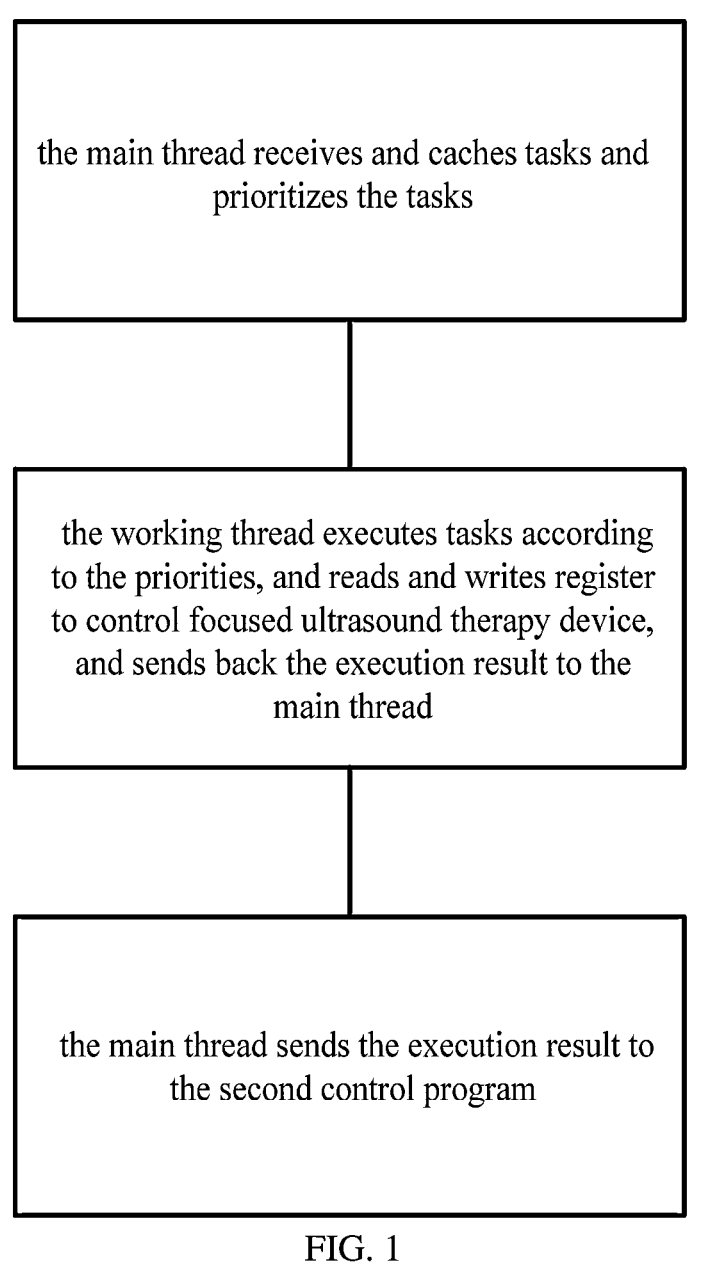

METHOD FOR CONTROLLING FOCUSED ULTRASOUND THERAPY DEVICE BASED ON ARM ARCHITECTURE

CROSS-REFERENCE TO RELATED APPLICATIONS

This application is a continuation application of International Application No. PCT/CN2021/082585, filed on Mar. 24, 2021, which claims priority to Chinese Patent Application No. 202010941501.5, filed on Sep. 9, 2020. The disclosures of the above-mentioned applications are incorporated herein by reference in their entireties.

TECHNICAL FIELD

The present application relates to a method for controlling a focused ultrasound therapy device based on an Acorn RISC Machine.

BACKGROUND

The focused ultrasound therapy system is a new non-invasive therapy technology that delivers focused ultrasound energy to the body in a non-invasive manner. Within approximately 15-30 seconds, the tissue at the focus of the ultrasound beam is heated to irreversible thermal coagulation, while the surrounding tissue remains in its natural state. Over time, the body gradually absorbs the burned tissue. The focused ultrasound therapy device generally uses a micro-controller or ARM embedded system to control the movement of the therapeutic ultrasound probe, uses phase-controlled ultrasound focusing, and controls the energy output of the amplifier system, and monitors the working status of multiple sensors such as a water cooling system and a power distribution system, and can respond as soon as possible to stop the energy output when abnormal. The development of the traditional embedded application software is device-oriented, i.e., the application software is developed according to the function and hardware of the device. However, with the development of hardware and technology, the scale of embedded application software becomes bigger and more complex, and the disadvantages of the software architecture are getting bigger and bigger, firstly, the application software architecture is poorly reusable and cannot be adapted to very complex business scenarios, especially when the devices change, a lot of code needs to be modified to adapt to the new business logic as soon as possible. Secondly, the traditional embedded application cannot handle the priority order of request and interrupt messages well and consistently, which affects the timeliness and reliability of business processing. Therefore, the traditional embedded application control architecture lacks high efficiency, reliability, and scalability.

SUMMARY

The purpose of the present application is to overcome the above-mentioned defects of the prior art and provide a method for controlling a focused ultrasound therapy device based on Acorn RISC Machine (ARM), with a timely response, a high reliability and a good scalability.

The purpose of the present application can be achieved by the following technical solution:

The present application provides a method for controlling a focused ultrasound therapy device based on Acorn RISC Machine (ARM), the focused ultrasound therapy device being connected to a workstation and an ARM embedded processor running a linux operating system, the ARM embedded processor storing a first control program, the workstation storing a second control program, the first control program communicating with the second control program via a transmission control protocol/internet protocol (TCP/IP), the method including:

the first control program controlling the focused ultrasound therapy device by executing a task and sending a task execution result to the second control program;

wherein the task includes an internal event and an operation instruction, the internal event includes a timer event of the first control program and an interrupt message of a linux kernel, the second control program receives the operation instruction through the workstation and sends the operation instruction to the first control program; and wherein, the first control program includes a main thread and a working thread, the main thread makes priorities for the task, priorities of the interrupt message, the operation instruction and the timer event decrease in order, and the working thread executes the task according to the priorities, and reads and writes a register of the ARM embedded processor according to the task execution result to control the focused ultrasound therapy device, and the main thread sends the task execution result to the second control program.

In an embodiment, the first control program further includes a signal thread, the task includes an exit message, the exit message has a priority between the interrupt message and the operation instruction, the signal thread sends the exit message to the main thread by closing a socket, and the operation instruction includes a control instruction and a status query instruction.

In an embodiment, the signal thread closes the socket when receiving an exit signal, the exit signal includes signint and sigterm.

In an embodiment, the socket is a unix socket pair.

In an embodiment, the main thread sends a linux signal to the working thread when receiving the interrupt message of the linux kernel; and the working thread interrupts a current task after receiving the linux signal and executes an interrupt response processing function.

In an embodiment, the linux signal is sigusr1.

In an embodiment, a protocol between the first control program and the second control program is encapsulated by a google protocol buffer.

In an embodiment, the first control program receives the interrupt message of the linux kernel by Netlink.

In an embodiment, the main thread receives the task via a libevent library.

In an embodiment, the first control program uses a C++ abstraction mechanism to encapsulate the task Compared with the prior art, the present application has the following beneficial effects.

(1) The present application uses a daemon process to execute tasks, the main thread receives the tasks and sorts the tasks according to priorities, the tasks include control instructions and status query instructions of the second control program, and interrupt messages and timer events of the linux kernel of the first control program. The working thread sends the task execution results to the main thread after executing the tasks, and the main thread sends the task execution results to the second control program through the TCP/IP port. The main thread can receive and cache tasks to avoid message congestion and improve concurrent processing capability, and the priority ranking of tasks improves the response timeliness and reliability of the focused ultrasound therapy device, which avoids the burden caused by multiple threads competing at the same time, the processing speed of the task is improved.

(2) The present application sets up a signal thread, which sends an exit message to the main thread by closing the socket, and the main thread safely exits after receiving the exit message, to avoid the possible leakage of system resources and hardware damage when the background process is abruptly ended.

(3) The present application adopts a Google Protocol Buffer to encapsulate the protocol between the first control program and the second control program, which is convenient for protocol extension and compatibility and has a wide range of application.

(4) The present application realizes the communication between the first control program and the linux kernel by the Netlink, which supports bidirectional communication and can be initiated by the linux kernel and supports broadcast mode, and the linux kernel sends interrupt messages to the main thread through the Netlink when an interrupt occurs.

(5) The present application adopts C++ abstraction mechanism to encapsulate the tasks of the first control program, and the first control program architecture is independent of the business processing logic, and the business logic is extended through the extended encapsulation mechanism, with a higher scalability and a higher universality.

BRIEF DESCRIPTION OF THE DRAWINGS

FIG. 1 is a flowchart of the method according to the present application.

DETAILED DESCRIPTION OF THE EMBODIMENTS

The present application is described in detail below in conjunction with the attached drawings and specific embodiments. The embodiments are implemented on the premise of the technical solution of the present application, and detailed implementation and specific operation procedures are given, but the scope of the present application is not limited to the following embodiments.

Figure 2:
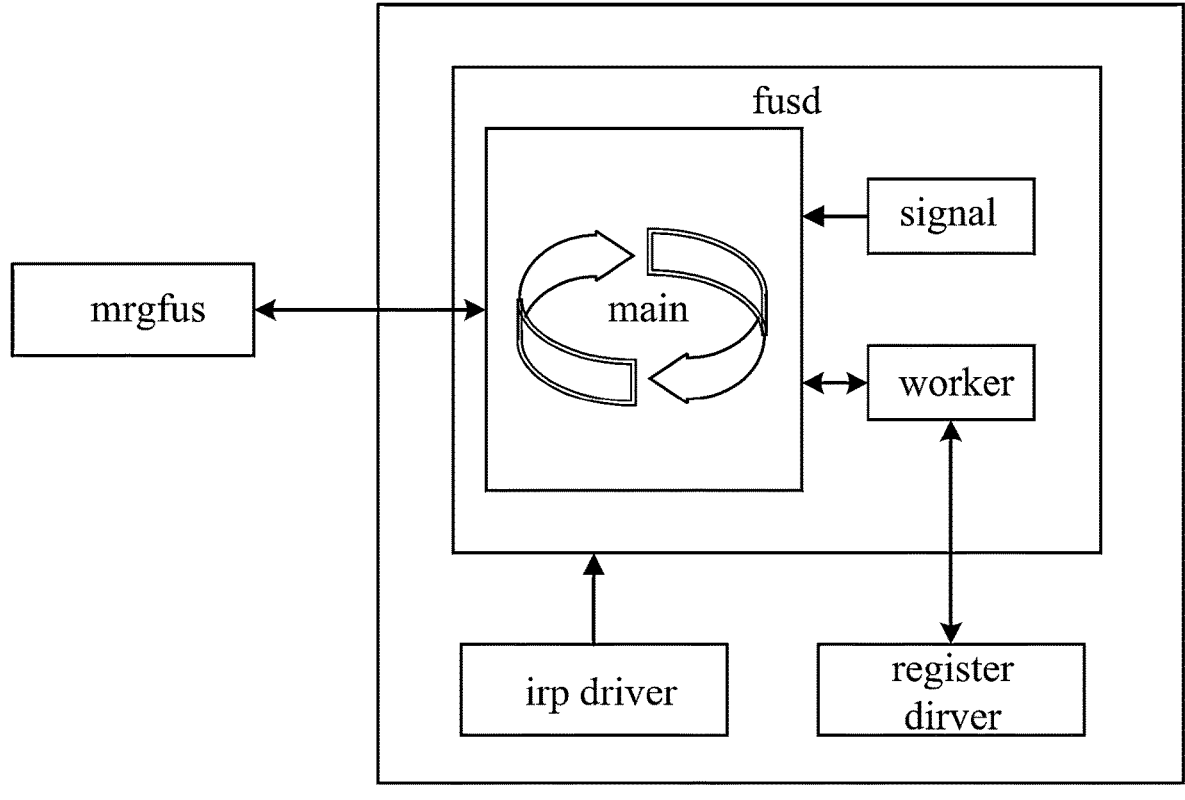
FIG. 2 is a diagram of the program control architecture according to the present application.
Figure 3:
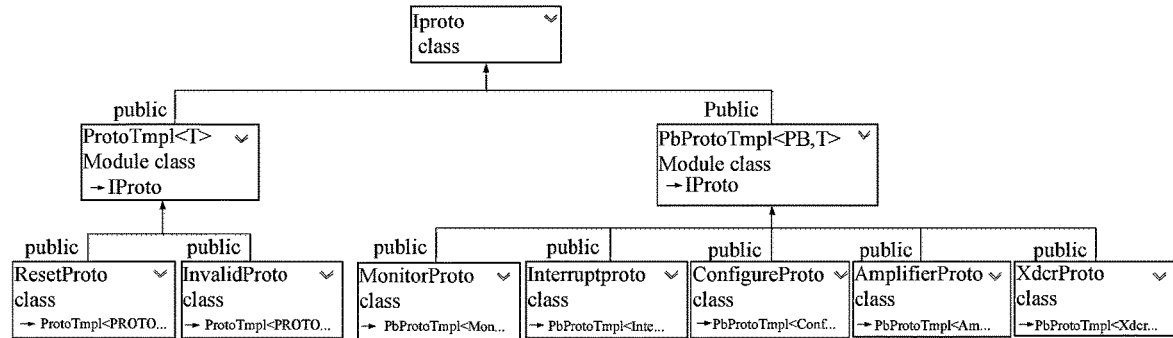
FIG. 3 is a class structure by using the C++ abstraction mechanism for encapsulating tasks according to the present application.

The present application provides a method for controlling a focused ultrasound therapy device based on an Acorn RISC Machine (ARM), as shown in FIG. 1, FIG. 2 and FIG. 3, the focused ultrasound therapy device is connected to a workstation and an ARM embedded processor running linux operating system, a first control program is stored in the ARM embedded processor, the first control program is a focused ultrasound control program fusd that uses C++ abstraction mechanism to encapsulate tasks, a second control program is stored in the workstation. The second control program is the upper computer therapy control program mrgfus, the fusd communicates with the mrgfus through a transmission control protocol/internet protocol (TCP/IP). The Google Protocol Buffer is used to encapsulate the protocol between mrgfus and fusd, and the linux kernel automatically loads the register driver and the interrupt driver when the linux kernel is booted.

The control method includes:

the fusd includes the main thread, the working thread and the signal thread, the main thread receives tasks through the libevent library and prioritizes the tasks, and the working thread calls the register driver from a high priority to a low priority to read and write the register of the ARM embedded processor through the bus, and the working thread sends the task execution result to the main thread through the pipeline (PIPE), and the main thread sends the task execution result to the mrgfus, and the workstation presents the task execution result through the user interface.

The tasks include an internal event and an operation instruction, the internal event includes a timer event of fusd, an interrupt message of linux kernel and an exit message from the signal thread. The priorities of the interrupt message, the exit messages, the control instruction, the status query, and the timer event decrease in order.

The irq driver is responsible for receiving the interrupt message from the Generic Interrupt Controller and sending the interrupt message to the main thread via Netlink, the main thread sends the linux signal to the working thread when receiving the interrupt message of the linux kernel, and the working thread interrupts the current task after receiving the linux signal and performs the interrupt response processing function. The linux signal is SIGUSR1, the working thread returns to task context from the interrupt processing program, and will choose to continue or terminate the execution of the task based on the result of the interrupt execution.

The operation instructions include control instructions and status query instructions. The mrgfus receives operation instructions through the user interface of the workstation and sends the operation instructions to fusd.

The signal thread sends an exit message to the main thread by closing the socket. The signal thread is blocked and waits for the exit signal. The exit signals include SIGNINT and SIGTERM, which are sent by the operating terminal connected to the ARM embedded processor. When the signal thread receives the exit signal to close the socket, the socket is a Unix Socket Pair, and the working thread executes the exit message to close the focused ultrasound therapy device and release the system resources and exits safely.

As shown in FIG. 3, the IProto base class is established by C++ abstraction mechanism, the template class ProtoTmpl of the internal timer event and the task template class PbProtoTmpl which encapsulates the Google Protocol Buffer are inherited from IProto, the ResetProto class is used to reset the device, the InvalidProto class is used to handle abnormality of the system, and inherited from IProto. The status query class MonitorProto, the configuration and installation class ConfigureProto, the amplifier control class AmplifierProto and the probe control class XdcrProto require protocol interaction with the application mrgfus and is inherited from PbProtoTmpl. Subsequent new task expansions can be added to the class that inherited from ProtoTmpl or PbProtoTmpl, respectively, without any other code changes.

EXAMPLE

The user sets the therapy parameters, i.e., control instructions, on the user interface of the workstation. The therapy parameters include probe movement parameters, energy setting parameters and energy output therapy parameters. The ARM embedded processor controls the operation of the focused ultrasound therapy device. The mrgfus encapsulates the control instructions through a protocol encapsulated by Google Protocol Buffer and sends to fusd running on the ARM embedded processor at once via TCP/IP. The main thread of fusd receives the control instructions from mrgfus, caches and prioritizes the control instructions, and the working thread executes the control instructions in order according to the priorities. If an abnormality occurs in the focused ultrasound therapy device and the working thread is executing the control instruction, the linux kernel sends an interrupt message to the main thread via Netlink. The working thread then returns from the interrupt response function and does not perform any other tasks, to find the abnormality of the focused ultrasound therapy device.

The embodiment proposes a method for controlling a focused ultrasound therapy device based on an Acorn RISC Machine. A daemon process is used to perform the task. The mrgfus receives the operation instruction through the user interface of the workstation and sends to the main thread of fusd through TCP/IP. The main thread receives and caches the tasks to ensure that the information is not blocked, specifically the message is interrupted and the main thread prioritizes the tasks, and the working thread executes the tasks according to the task sequences. The focused ultrasound therapy device is controlled by reading and writing registers. The main thread and signal thread would not compete with the working thread, avoiding the burden of locking. The main thread feeds back the task execution result to mrgfus, and the user interface of the workstation displays the task execution result and feeds back to the user. The control process of the focused ultrasound therapy device responds in time with high reliability. The signal thread sends the exit message to the main thread, and the main thread exits safely after receiving the exit message. The Google Protocol Buffer is used to encapsulate the protocol between mrgfus and fusd, which is convenient for protocol expansion and compatibility according to business scenarios. The communication between fusd and linux kernel is realized through Netlink to ensure the short time for interrupting notification message and timely response. The fusd uses C++ abstraction mechanism to encapsulate tasks such as control instructions and status inquiry instructions for the focused ultrasound therapy. The architecture of fusd has nothing to do with business processing logic, and the business logic is expanded by the extended encapsulation mechanism with strong extensibility and commonality. In summary, the control method proposed in the embodiment adopts the design scheme of low coupling and high cohesion, which has the advantages of high concurrency, high reliability and high expansion.

The above describes in detail a preferred specific embodiment of the present application. It should be understood that those skilled in the art can make many modifications and variations according to the idea of the present application without creative labor. Therefore, any technical solution that can be obtained by those skilled in the art through logical analysis, reasoning or limited experiment on the basis of the prior art according to the inventive idea of the present application shall be within the scope determined by the claims.

What is claimed is:

1. A method for controlling a focused ultrasound therapy device having an Acorn RISC Machine (ARM) embedded processor embedded therein, the focused ultrasound therapy device being connected to a workstation and the ARM embedded processor running a linux kernel, the ARM embedded processor storing a first control program, the workstation storing a second control program, the first control program communicating with the second control program via a transmission control protocol/internet protocol (TCP/IP), the method comprising:

the first control program, which comprises a main thread a working thread, controlling the focused ultrasound therapy device by executing a task of one or more tasks cached by the main thread and the main thread sending a task execution result of the executed task to the second control program;

wherein the task comprises an internal event and an operation instruction, the internal event comprises a timer event of the first control program and an interrupt message of the linux kernel, the second control program receives the operation instruction from a user of the workstation through the workstation and sends the operation instruction to the first control program via the TCP/IP; and wherein the main thread makes priorities for the one or more cached tasks, and where priorities of the interrupt message, the operation instruction and the timer event are made to decrease in order, and the working thread executes the cached one or more tasks according to the priorities from a high priority to a low priority, and reads and writes a register of the ARM embedded processor according to the task execution result to control the focused ultrasound therapy device, and the worker thread sends the task execution result to the main thread.

2. The method according to claim 1, wherein the first control program further comprises a signal thread, the task comprises an exit message, the exit message has a priority between the interrupt message and the operation instruction, the signal thread sends the exit message to the main thread by closing a socket, and the operation instruction comprises a control instruction and a status query instruction.

3. The method according to claim 2, wherein the signal thread closes the socket when receiving an exit signal, the exit signal comprises signint and sigterm.

4. The method according to claim 2, wherein the socket is a unix socket pair.

5. The method according to claim 1, wherein the main thread sends a linux signal to the working thread when receiving the interrupt message of the linux kernel; and the working thread interrupts a current task after receiving the linux signal and executes an interrupt response processing function.

6. The method according to claim 5, wherein the linux signal is sigusr1.

7. The method according to claim 1, wherein a protocol between the first control program and the second control program is encapsulated by a google protocol buffer.

8. The method according to claim 1, wherein the first control program receives the interrupt message of the linux kernel by netlink.

9. The method according to claim 1, wherein the main thread receives the task via a libevent library.

10. The method according to claim 1, wherein the first control program uses a C++ abstraction mechanism to encapsulate the task.

* * * * *